US008766592B2

(12) United States Patent
Fujita

(10) Patent No.: US 8,766,592 B2
(45) Date of Patent: Jul. 1, 2014

(54) POWER SUPPLY APPARATUS, CONTROL METHOD, AND COMPUTER-READABLE RECORDING MEDIUM

(75) Inventor: Shunji Fujita, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 491 days.

(21) Appl. No.: 13/070,738

(22) Filed: Mar. 24, 2011

(65) Prior Publication Data

US 2011/0234156 A1    Sep. 29, 2011

(30) Foreign Application Priority Data

Mar. 25, 2010    (JP) .................................. 2010-070563

(51) Int. Cl.
*H02J 7/00*    (2006.01)
(52) U.S. Cl.
USPC ........... 320/108; 320/107; 320/109; 320/114; 320/115; 320/139; 455/69; 455/411
(58) Field of Classification Search
USPC ................. 320/107, 108, 109, 114, 115, 139; 455/69, 89, 411
See application file for complete search history.

(56) References Cited

U.S. PATENT DOCUMENTS

| 6,211,649 B1 * | 4/2001 | Matsuda ........................ 320/115 |
| 7,893,660 B2 * | 2/2011 | Veselic et al. .................. 320/155 |
| 7,979,553 B2 * | 7/2011 | Fujita ............................ 709/227 |
| 7,999,514 B2 * | 8/2011 | Veselic et al. .................. 320/134 |
| 2003/0210106 A1 | 11/2003 | Cheng |
| 2003/0216089 A1 * | 11/2003 | Uryu .............................. 439/894 |
| 2004/0217733 A1 * | 11/2004 | Liu et al. ........................ 320/114 |
| 2005/0116683 A1 | 6/2005 | Cheng |
| 2009/0011709 A1 * | 1/2009 | Akasaka et al. ............. 455/41.3 |

FOREIGN PATENT DOCUMENTS

| CN | 1808336 A | 7/2006 |
| JP | 2001-008376 A | 1/2001 |
| JP | 2005-525705 T | 8/2005 |
| JP | 2007-089341 A | 4/2007 |
| JP | 2009-296705 A | 12/2009 |
| JP | 2010-022105 A | 1/2010 |
| WO | 03096361 A1 | 11/2003 |
| WO | 03096512 A2 | 11/2003 |
| WO | 2004038888 A2 | 5/2004 |

\* cited by examiner

*Primary Examiner* — Yalkew Fantu
(74) *Attorney, Agent, or Firm* — Canon USA, Inc. IP Division

(57) ABSTRACT

An apparatus includes a detection unit configured to detect that a first power receiving apparatus is in a predetermined range and a second power receiving apparatus is in the predetermined range, a power supply unit configured to supply power to the first and the second power apparatuses if the first and the second power receiving apparatuses are in the predetermined range, an acquisition unit configured to acquire first information and second information, and a control unit configured to select one of the first and the second power receiving apparatuses based on the first and the second information if the first and the second power receiving apparatuses are in the predetermined range, wherein the control unit controls a selected apparatus to perform a predetermined process.

18 Claims, 14 Drawing Sheets

FIG. 3A

| No. | ID | CONNECTION TIME |
|---|---|---|
| 1 | MobilePhone_00001 | 2009/10/01 19:12 |
| 2 | DSC_00001 | 2009/10/01 20:32 |
| 3 | DVC_00001 | 2009/10/01 20:32 |
| 4 | MobilePhone_00002 | 2009/10/01 22:56 |
| 5 | MobilePhone_00001 | 2009/10/02 19:25 |
| 6 | MobilePhone_00002 | 2009/10/02 23:43 |
| 7 | MobilePhone_00001 | 2009/10/03 19:43 |
| 8 | DSC_00001 | 2009/10/04 22:13 |
| 98 | DSC_00001 | 2009/10/30 19:32 |
| 99 | MobilePhone_00002 | 2009/10/30 22:59 |
| 100 | MobilePhone_00001 | 2009/10/31 20:02 |

FIG. 3B

| No. | ID | CONNECTION TIME | REMOVAL TIME |
|---|---|---|---|
| 1 | MobilePhone_00001 | 2009/10/01 19:12 | 2009/10/02 07:20 |
| 2 | DSC_00001 | 2009/10/01 20:32 | 2009/10/04 12:10 |
| 3 | DVC_00001 | 2009/10/01 20:32 | 2009/10/08 10:32 |
| 4 | MobilePhone_00002 | 2009/10/01 22:56 | 2009/10/02 10:22 |
| 5 | MobilePhone_00001 | 2009/10/02 19:25 | 2009/10/03 07:21 |
| 6 | MobilePhone_00002 | 2009/10/02 23:43 | 2009/10/03 10:22 |
| 7 | MobilePhone_00001 | 2009/10/03 19:43 | 2009/10/04 07:23 |
| 8 | DSC_00001 | 2009/10/04 22:13 | 2009/10/19 11:38 |
| 98 | DSC_00001 | 2009/10/30 19:32 | — |
| 99 | MobilePhone_00002 | 2009/10/30 22:59 | 2009/10/31 10:25 |
| 100 | MobilePhone_00001 | 2009/10/31 20:02 | — |

FIG. 3C

| No. | ID | NUMBER OF TIMES OF CONNECTION/MONTH |
|---|---|---|
| 1 | MobilePhone_00001 | 45 |
| 2 | MobilePhone_00002 | 37 |
| 3 | DSC_00001 | 11 |
| 4 | DVC_00001 | 7 |

FIG. 7A

| No. | ID | CONNECTION TIME |
|---|---|---|
| 1 | MobilePhone_00001 | 2009/10/01 19:12 |
| 2 | DSC_00001 | 2009/10/01 20:32 |
| 3 | DVC_00001 | 2009/10/01 20:32 |
| 4 | MobilePhone_00002 | 2009/10/01 22:56 |
| 5 | MobilePhone_00001 | 2009/10/02 19:25 |
| 6 | MobilePhone_00002 | 2009/10/02 23:43 |
| 7 | MobilePhone_00001 | 2009/10/03 19:43 |
| 8 | DSC_00001 | 2009/10/04 22:13 |
| 98 | DSC_00001 | 2009/10/30 19:32 |
| 99 | MobilePhone_00002 | 2009/10/30 22:59 |
| 100 | MobilePhone_00001 | 2009/10/31 20:02 |
| 101 | MobilePhone_00002 | 2009/10/31 21:00 |

FIG. 7B

| No. | ID | CONNECTION TIME | REMOVAL TIME |
|---|---|---|---|
| 1 | MobilePhone_00001 | 2009/10/01 19:12 | 2009/10/02 07:20 |
| 2 | DSC_00001 | 2009/10/01 20:32 | 2009/10/04 12:10 |
| 3 | DVC_00001 | 2009/10/01 20:32 | 2009/10/08 10:32 |
| 4 | MobilePhone_00002 | 2009/10/01 22:56 | 2009/10/02 10:22 |
| 5 | MobilePhone_00001 | 2009/10/02 19:25 | 2009/10/03 07:21 |
| 6 | MobilePhone_00002 | 2009/10/02 23:43 | 2009/10/03 10:20 |
| 7 | MobilePhone_00001 | 2009/10/03 19:43 | 2009/10/04 07:23 |
| 8 | DSC_00001 | 2009/10/04 22:13 | 2009/10/19 11:38 |
| 98 | DSC_00001 | 2009/10/30 19:32 | — |
| 99 | MobilePhone_00002 | 2009/10/30 22:59 | 2009/10/31 10:25 |
| 100 | MobilePhone_00001 | 2009/10/31 20:02 | — |
| 101 | MobilePhone_00002 | 2009/10/31 21:00 | — |

FIG. 7C

| No. | ID | NUMBER OF TIMES OF CONNECTION/MONTH |
|---|---|---|
| 1 | MobilePhone_00001 | 45 |
| 2 | MobilePhone_00002 | 38 |
| 3 | DSC_00001 | 11 |
| 4 | DVC_00001 | 7 |

FIG.9

| No. | ID | NUMBER OF TIMES OF CONNECTION/MONTH | ESTIMATED REMOVAL TIME |
|---|---|---|---|
| 1 | MobilePhone_00001 | 45 | 07:20 |
| 2 | MobilePhone_00002 | 38 | 10:21 |
| 3 | DSC_00001 | 11 | 11:30 |
| 4 | DVC_00001 | 7 | 10:30 |

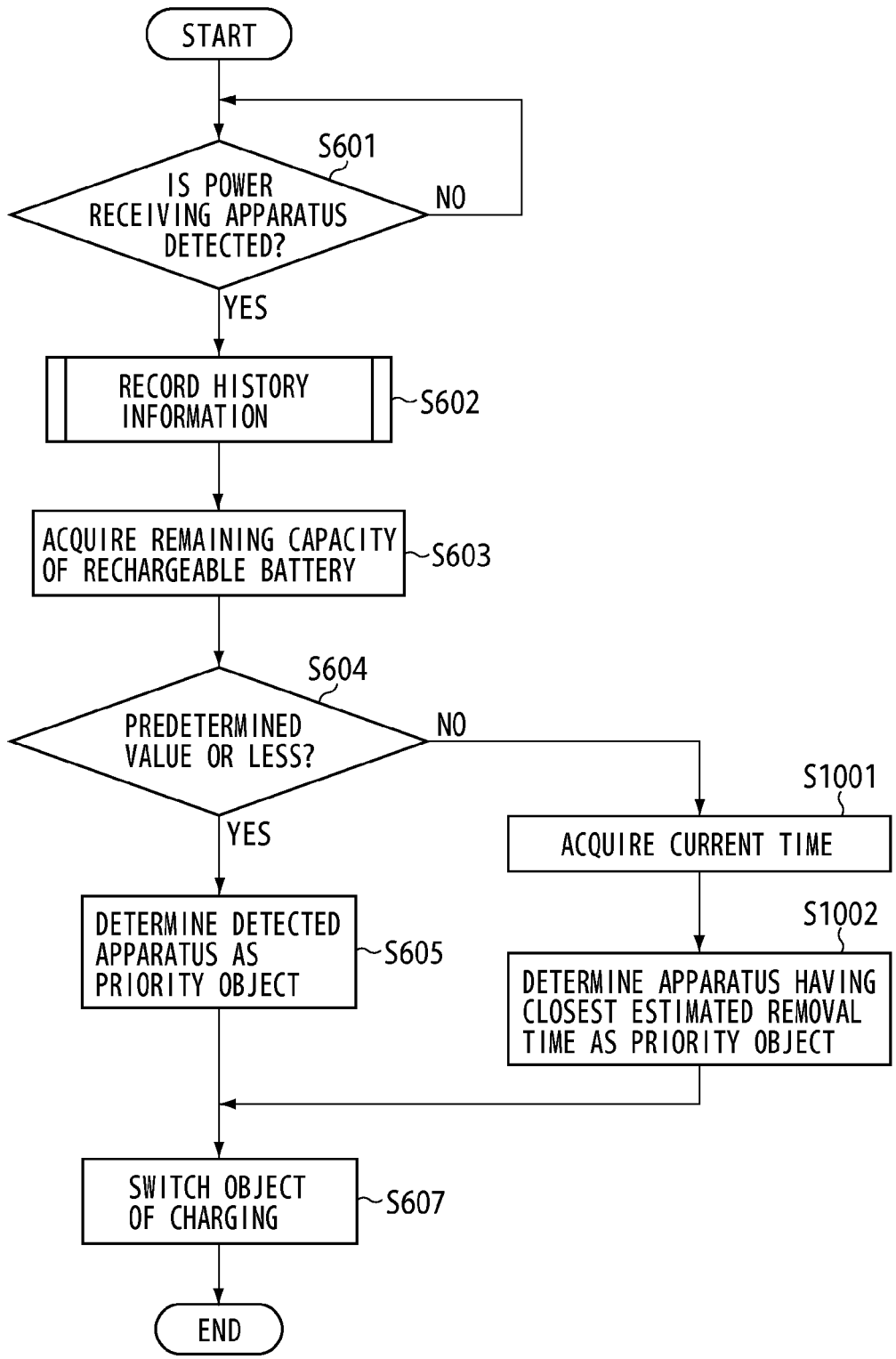

POWER SUPPLY APPARATUS, CONTROL METHOD, AND COMPUTER-READABLE RECORDING MEDIUM

BACKGROUND OF THE INVENTION

1. Field of the Invention

The present invention relates to a power supply apparatus capable of charging a plurality of electronic apparatuses in a non-contact manner, a control method, and a computer-readable recording medium.

2. Description of the Related Art

Conventionally, a non-contact charging system in which a power supply apparatus supplies power to a power receiving apparatus having a rechargeable battery, such as a digital still camera or a mobile phone, in a non-contact manner without being connected thereto by a connector or the like has been known. The non-contact charging system uses a charging method for magnetically coupling a power supply apparatus having a primary coil and a power receiving apparatus having a secondary coil to each other and generating power in the secondary coil by an alternating current (AC) magnetic field generated from the primary coil, to cause the power receiving apparatus to charge the battery.

Japanese Unexamined Patent Application Publication No. 2005-525705 discusses a charging method in which one power supply apparatus supplies power to a plurality of power receiving apparatuses at the same time without establishing a one-to-one correspondence between the power supply apparatus and the power receiving apparatus.

However, when one power supply apparatus supplies power to a plurality of power receiving apparatuses in a non-contact manner, the power supplied from the power supply apparatus is divided among the plurality of power receiving apparatuses when supplied. Thus, power to be supplied to each of the power receiving apparatuses is less than the power supplied from the one power supply apparatus to one power receiving apparatus. Therefore, it takes much time to finish charging all the power receiving apparatuses.

When a period of time that the power supply apparatus charges the plurality of power receiving apparatuses is short, the power receiving apparatus desired by a user cannot be used because all the power receiving apparatuses have not finished charging their batteries.

SUMMARY OF THE INVENTION

According to an aspect of the present invention, a power supply apparatus includes a detection unit configured to detect that a first power receiving apparatus is in a predetermined range and a second power receiving apparatus is in the predetermined range, a power supply unit configured to supply power to the first and the second power apparatuses if the first and the second power receiving apparatuses are in the predetermined range, an acquisition unit configured to acquire first and second information, and a control unit configured to select one of the first and the second power receiving apparatuses based on the first and the second information if the first and the second power receiving apparatuses are in the predetermined range, wherein the control unit controls a selected apparatus to perform a predetermined process, wherein the predetermined process includes a process for charging a battery, wherein the first information includes information indicating that a first number of times it has been detected the first power receiving apparatus is in the predetermined range, and wherein the second information includes information indicating that a second number of times it has been detected the second power receiving apparatus is in the predetermined range.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIGS. 3A to 3C illustrate examples of a history information table according to the first exemplary embodiment of the present invention.

FIGS. 7A to 7C illustrate examples of a history information table according to the first exemplary embodiment of the present invention.

FIG. 9 illustrates an example of a history information table according to the second exemplary embodiment of the present invention.

FIG. 10 is a flowchart illustrating an example of second selection process performed in the second exemplary embodiment of the present invention.

DESCRIPTION OF THE EMBODIMENTS

Various exemplary embodiments, features, and aspects of the invention will be described in detail below with reference to the drawings.

A first exemplary embodiment of the present invention is described with reference to the drawings.

Figure 1A:
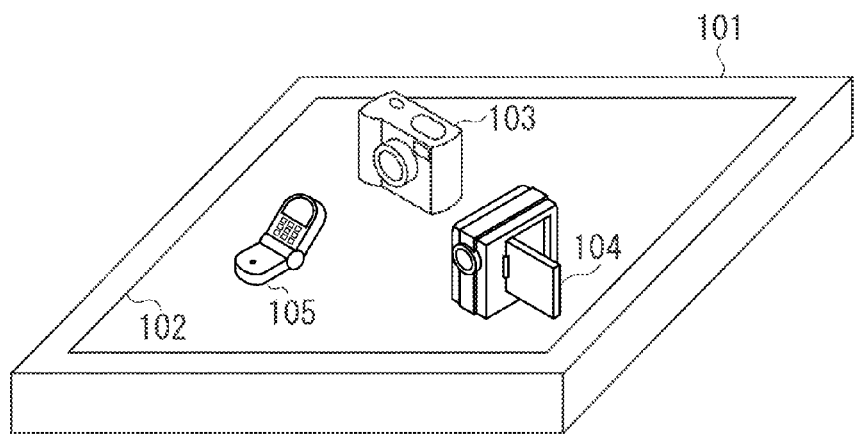
FIGS. 1A and 1B illustrate an example of a non-contact charging system according to a first exemplary embodiment and a second exemplary embodiment of the present invention.
Figure 1B:
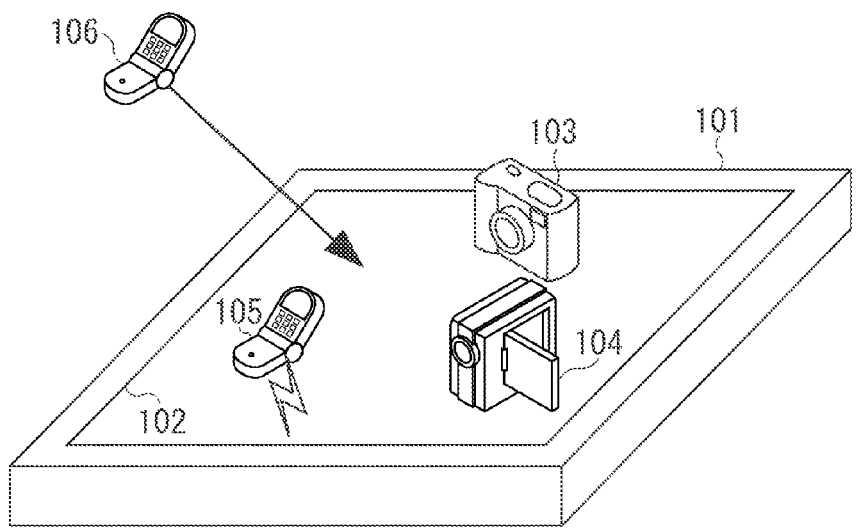

FIGS. 1A and 1B illustrate a non-contact charging system according to the first exemplary embodiment. The non-contact charging system illustrated in FIGS. 1A and 1B includes a power supply apparatus 101, and a digital still camera 103, a digital video camera 104, and mobile phones 105 and 106 which are supplied with power by the power supply apparatus 101. The digital still camera 103 is referred to as a "camera 103", and the digital video camera 104 is referred to as a "video camera 104".

The power supply apparatus 101 includes a power supply coil for generating a magnetic flux from an AC power supply. Each of the camera 103, the video camera 104, the mobile phone 105, and the mobile phone 106 is a power receiving apparatus including a secondary battery that can be charged by power received in a non-contact manner with the power supply apparatus 101. Further, each of the camera 103, the video camera 104, the mobile phone 105, and the mobile phone 106 includes a power receiving coil for generating an induced electromotive force by the magnetic flux supplied from the power supply apparatus 101. A charging area 102 illustrated in FIGS. 1A and 1B is a predetermined power-suppliable range in which the power supply apparatus 101 can supply power to charge the secondary battery to the camera 103, the video camera 104, the mobile phone 105, and the mobile phone 106 in a non-contact manner.

When the camera 103, the video camera 104, the mobile phone 105, and the mobile phone 106 are placed on the charging area 102, the power supply apparatus 101 determines that the camera 103, the video camera 104, the mobile phone 105, and the mobile phone 106 exist in the predetermined power-suppliable range. In this case, the power supply apparatus 101 can supply power to the camera 103, the video camera 104, the mobile phone 105, and the mobile phone 106, which are placed on the charging area 102.

When if the camera 103, the video camera 104, the mobile phone 105, and the mobile phone 106 are not placed on the charging area 102, the power supply apparatus 101 determines that the camera 103, the video camera 104, the mobile phone 105, and the mobile phone 106 do not exist in the predetermined power-suppliable range. In this case, the camera 103, the video camera 104, the mobile phone 105, and the mobile phone 106 cannot receive the power supplied from the power supply apparatus 101.

Figure 2:
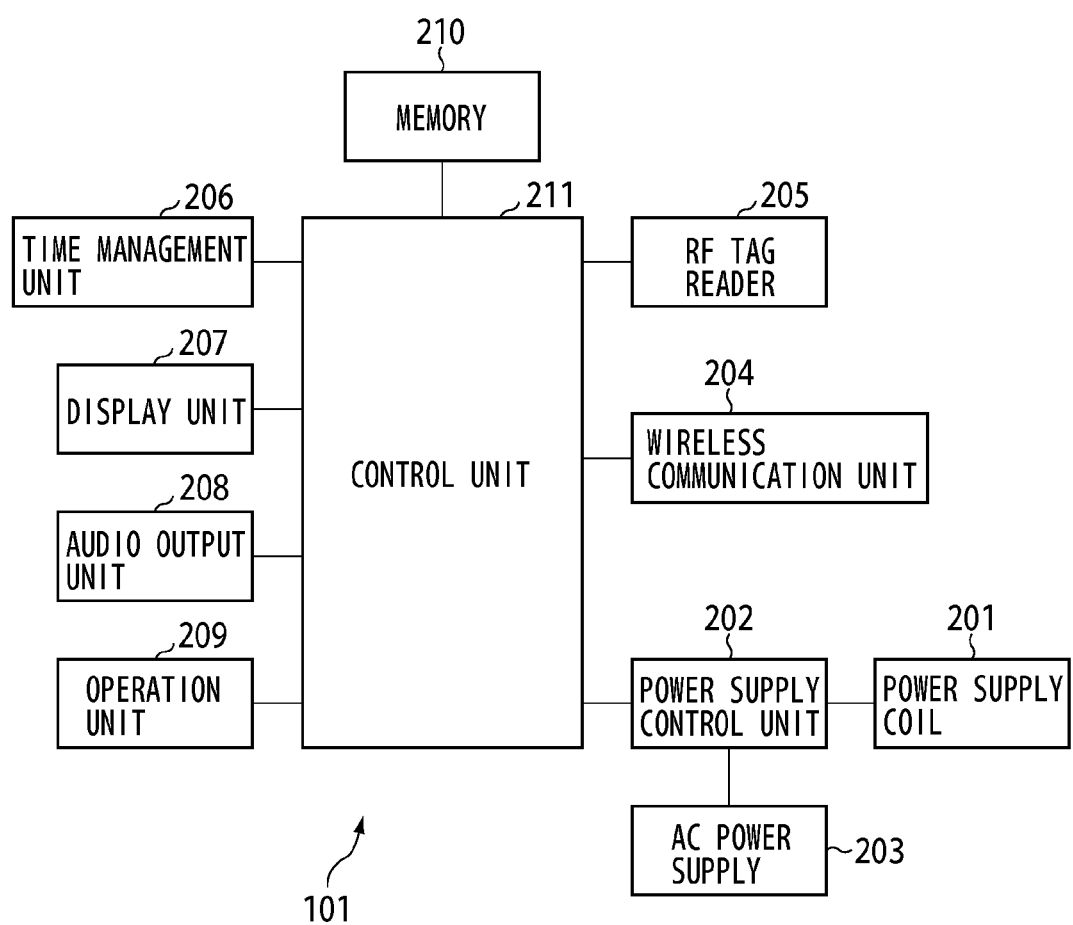
FIG. 2 is a block diagram illustrating an example of a configuration of a power supply apparatus according to each of first and second exemplary embodiments of the present invention.

FIG. 2 is a block diagram illustrating an example of a configuration of the power supply apparatus 101 illustrated in FIGS. 1A and 1B. The power supply apparatus 101 illustrated in FIG. 2 includes a power supply coil 201, a power supply control unit 202, an AC power supply 203, a wireless communication unit 204, a radio frequency (RF) tag reader 205, a time management unit 206, a display unit 207, a voice output unit 208, an operation unit 209, a memory 210, and a control unit 211.

The power supply coil 201 generates an AC magnetic field by power supplied from the AC power supply 203, and supplies power to the camera 103, the video camera 104, the mobile phone 105, and the mobile phone 106, which are placed on the charging area 102, in parallel in a non-contact manner. The power supply coil 201 functions as a power supply unit.

The power supply control unit 202 controls the power supply coil 201. The control unit 211 controls the power supply control unit 202.

The AC power supply 203 is a commercial power supply, for example, and supplies power to the camera 103, the video camera 104, the mobile phone 105, and the mobile phone 106 and supplies power for operating the whole power supply apparatus 101.

The wireless communication unit 204 individually communicates with the camera 103, the video camera 104, the mobile phone 105, and the mobile phone 106 by a wireless local area network (LAN) or the like. The wireless communication unit 204 requests processes relating to charging, for example, start of charging, end of charging, and acquisition of information relating to charged states of the power receiving apparatuses such as the camera 103, the video camera 104, the mobile phone 105, and the mobile phone 106. The charged state information include information about a remaining capacity of a rechargeable battery (secondary battery) in each of the power receiving apparatuses and information about a period of time during which each of the power receiving apparatuses can be used.

In the first exemplary embodiment, the wireless communication unit 204 individually performs wireless communication with the camera 103, the video camera 104, the mobile phone 105, and the mobile phone 106 using a communication method conforming to wireless LAN communication standard such as Institute of Electrical and Electronic Engineers (IEEE) 802. 11a/b/g. The wireless communication unit 204 may individually communicate with one of the camera 103, the video camera 104, the mobile phone 105, and the mobile phone 106 using a communication method other than the communication method conforming to the wireless LAN communication standard such as IEEE 802. 11a/b/g.

The RF tag reader 205 is a non-contact integrated circuit (IC) chip, and individually communicates with the camera 103, the video camera 104, the mobile phone 105, and the mobile phone 106 when the camera 103, the video camera 104, the mobile phone 105, and the mobile phone 106 are placed on the charging area 102. The RF tag reader 205 individually reads information such as identification information and an internet protocol (IP) address for performing wireless LAN communication from the camera 103, the video camera 104, the mobile phone 105, and the mobile phone 106. The information read by the RF tag reader 205 is input to the control unit 211.

The RF tag reader 205 periodically performs poling, to detect that the camera 103, the video camera 104, the mobile phone 105, and the mobile phone 106 exist in the charging area 102. The RF tag reader 205 can also detect that any one of the camera 103, the video camera 104, the mobile phone 105, and the mobile phone 106 has been removed from the charging area 102. The RF tag reader 205 can simultaneously recognize a plurality of RF tags 405.

The time management unit 206 manages the time when the power supply apparatus 101 starts to supply power and the current time, and inputs time information representing the current time to the control unit 211 in response to a request from the control unit 211.

The display unit 207 includes a liquid crystal display, a light emitting diode (LED), or the like, and displays a status of the power supply apparatus 101. Items of the status include a status relating to an operation of the power supply apparatus 101, a status relating to charging control, and a status relating to data communication by the wireless communication unit 204. The audio output unit 208 includes a speaker or the like, and notifies a user of the status of the power supply apparatus 101 by outputting audio data.

The operation unit 209 includes a power supply button for receiving input from the user, a charging button for issuing an instruction to start or stop charging, and so on.

The memory 210 is used as a work area for the control unit 211 to execute a program and an area for storing information received by the wireless communication unit 204. The memory 210 also stores a history information table.

FIGS. 3A to 3C illustrate examples of the history information table recorded in the memory 210. The history information table manages the camera 103, the video camera 104, the mobile phone 105, and the mobile phone 106 using history information acquired from the camera 103, the video camera 104, the mobile phone 105, and the mobile phone 106.

The history information table illustrated in FIG. 3A manages the order in which the camera 103, the video camera 104, the mobile phone 105, and the mobile phone 106 are connected by associating with identification information about any one of the camera 103, the video camera 104, the mobile phone 105, and the mobile phone 106. Further, the history information table manages the camera 103, the video camera 104, the mobile phone 105, and the mobile phone 106 by associating with connection time representing the time when the camera 103, the video camera 104, the mobile phone 105, and the mobile phone 106 have been placed on the charging area 102.

The order in which the camera 103, the video camera 104, the mobile phone 105, and the mobile phone 106 are connected is an item "No." (number) illustrated in FIGS. 3A to 3C. The identification information relating to any one of the camera 103, the video camera 104, the mobile phone 105, and the mobile phone 106 is an item "ID" illustrated in FIGS. 3A to 3C. The connection time representing the time when any one of the camera 103, the video camera 104, the mobile phone 105, and the mobile phone 106 is connected is an item "connection time" illustrated in FIGS. 3A and 3B. The order in which the camera 103, the video camera 104, the mobile phone 105, and the mobile phone 106 are connected is the order in which they are detected to have been placed on the charging area 102.

The history information table illustrated in FIG. 3B manages the camera 103, the video camera 104, the mobile phone 105, and the mobile phone 106 by associating with removal time representing the time when any one of the camera 103, the video camera 104, the mobile phone 105, and the mobile phone 106 is removed from the charging area 102. The removal time representing the time when any one of the camera 103, the video camera 104, the mobile phone 105, and the mobile phone 106 is removed is an item "removal time" illustrated in FIG. 3B. When a hyphen is indicated in the column of the item "removal time", any one of the camera 103, the video camera 104, the mobile phone 105, and the mobile phone 106 is currently placed on the charging area 102.

The removal time is acquired from the time management unit 206 when the RF tag reader 205 detects that any one of the camera 103, the video camera 104, the mobile phone 105, and the mobile phone 106 has removed from the charging area 102, as similarly to the connection time.

The history information table may store the number of times of connection and the number of times of removal. The number of times of connection means the number of times any one of the camera 103, the video camera 104, the mobile phone 105, and the mobile phone 106 is detected to have been placed on the charging area 102. The number of times of connection is calculated based on the order in which the power receiving apparatuses are connected, identification information about each of the power receiving apparatuses, and the time when each of the power receiving apparatuses is connected. The number of times of removal means the number of times any one of the camera 103, the video camera 104, the mobile phone 105, and the mobile phone 106 is detected to have been removed from the charging area 102. The number of times of removal is calculated based on the order in which the power receiving apparatuses are connected, identification information about each of the power receiving apparatuses, and the time when each of the power receiving apparatuses is removed.

The history information table illustrated in FIG. 3C manages the camera 103, the video camera 104, the mobile phone 105, and the mobile phone 106 by associating with the item "No.", the item "ID", and an item "number of times of connection/month" that is information representing the number of times any one of the camera 103, the video camera 104, the mobile phone 105, and the mobile phone 106 is connected per month. The item "number of times of connection/month" is information calculated from the item "connection time" and the item "removal time". While a period during which the number of times of connection is calculated is one month in FIG. 3C, this is one example. For example, the period may be changed into one week and three months.

The control unit 211 is connected to the power supply control unit 202, the wireless communication unit 204, the RF tag reader 205, the time management unit 206, the display unit 207, the voice output unit 208, the operation unit 209, and the memory 210, and controls of the units. The control unit 211 includes a processor operated by a predetermined program. The control unit 211 calculates "number of times of connection/month" included in the history information table illustrated in FIG. 3C from the items "connection time" and "removal time".

Figure 4:
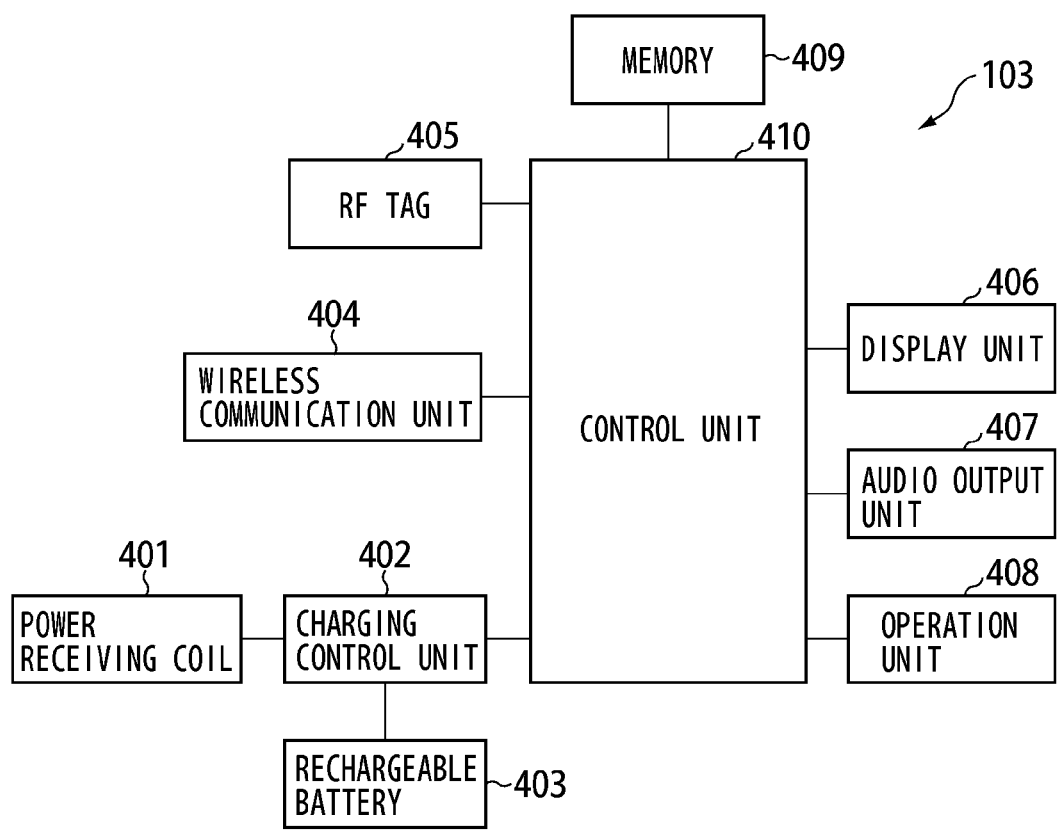
FIG. 4 is a block diagram illustrating an example of a configuration of a power receiving apparatus according to each of the first and second exemplary embodiments of the present invention.

FIG. 4 is a block diagram illustrating a configuration of the camera 103 illustrated in FIGS. 1A and 1B. The camera 103 illustrated in FIG. 4 includes a power receiving coil 401, a charging control unit 402, a rechargeable battery 403, a wireless communication unit 404, an RF tag 405, a display unit 406, an audio output unit 407, an operation unit 408, a memory 409, and a control unit 410.

The power receiving coil 401 receives power supplied from the power supply coil 201 in the power supply apparatus 101 in a non-contact manner based on control by the charging control unit 402 when the camera 103 is placed on the charging area 102.

The charging control unit 402 charges the rechargeable battery 403 based on the power received by the power receiving coil 401. The charging control unit 402 switches start and stop of charging of the rechargeable battery 403 by the power supplied via the power receiving coil 401 according to the control by the control unit 410. Further, the charging control unit 402 detects the remaining capacity of the rechargeable battery 403 and detects a period of time during which the camera 100 can be used. In response to a request from the control unit 410, the charging control unit 402 provides charged state information including information about the detected remaining capacity of the rechargeable battery 403 and information about the detected period of time during which the camera 100 to the control unit 411.

The rechargeable battery 403 is a secondary battery supplied with the power received by the power receiving coil 401. The rechargeable battery 403 is a secondary battery that can be detachably attached to the camera 103. The rechargeable battery 403 is a lithium ion battery, for example.

The wireless communication unit 404 communicates with the wireless communication unit 204 in the power supply apparatus 101 using a wireless LAN or the like, and responds to various types of process requests transmitted from the power supply apparatus 101. In the first exemplary embodiment, the wireless communication unit 404 individually performs wireless communication with the power supply apparatus 101 using a communication method conforming to the wireless LAN communication standard such as IEEE 802.11a/b/g. The wireless communication unit 404 may individually communicate with the power supply apparatus 101 by a communication method other than the communication method conforming to the wireless LAN communication standard such as IEEE 802.11a/b/g.

The RF tag 405 is a non-contact IC chip. Identification information which can specify the camera 103 and an IP address set in the wireless communication unit 404 are recorded in the RF tag 405. The RF tag 405 is mounted on a part of a housing of the camera 103. The RF tag reader 205 in the power supply apparatus 101 reads the identification information recorded in the RF tag 405 in a non-contact manner when the camera 103 is placed on the charging area 102.

The display unit 406 includes a liquid crystal display, a light emitting diode (LED), or the like, and displays a status of the camera 103. Items of the status include a status relating to an operation of the camera 103, a status relating to charging control, and a status relating to data communication in the wireless communication unit 404.

The audio output unit 407 notifies the status of the camera 103 by outputting audio using a speaker or the like. The operation unit 408 receives operation input from the user using a button or a key. The memory 409 is used as a work area for the control unit 410 to execute a program.

The control unit 410 is connected to the charging control unit 402, the wireless communication unit 404, the RF tag 405, the display unit 406, the voice output unit 407, the operation unit 408, and the memory 409, controls the units, and includes a processor operated by various types of programs.

The video camera 104, the mobile phone 105, and the mobile phone 106 have similar configurations to that of the camera 103. Thus, the video camera 104 includes a power receiving coil 501, a charging control unit 502, a rechargeable battery 503, a wireless communication unit 504, an RF tag 505, a display unit 506, an audio output unit 507, an operation unit 508, a memory 509, and a control unit 510, which are not illustrated.

The mobile phone 105 also includes a power receiving coil 601, a charging control unit 602, a rechargeable battery 603, a wireless communication unit 604, an RF tag 605, a display unit 606, an audio output unit 607, an operation unit 608, a memory 609, and a control unit 610, which are not illustrated. The mobile phone 106 also includes a power receiving coil 701, a charging control unit 702, a rechargeable battery 703 (first battery), a wireless communication unit 704, an RF tag 705, a display unit 706, an audio output unit 707, an operation unit 708, a memory 709, and a control unit 710, which are not illustrated.

Configurations and operations of the video camera 104, the mobile phone 105, and the mobile phone 106 are common to those of the camera 103, and hence the descriptions thereof are not repeated. Configurations of the power receiving coil 501 to the control unit 510 in the video camera 104 will be described as similar to the configurations of the power receiving coil 401 to the control unit 410 in the camera 103.

Similarly, configurations of the power receiving coil 601 to the control unit 610 in the mobile phone 105 and configurations of the power receiving coil 701 to the control unit 710 in the mobile phone 106 will also be described as similar to the configurations of the power receiving coil 401 to the control unit 410 in the camera 103.

The camera 103, the video camera 104, the mobile phone 105, and the mobile phone 106 are examples of a power receiving apparatus for charging a mounted secondary battery, as illustrated in FIG. 4. Therefore, the power receiving apparatus may include processing units other than the power receiving coil 401, the charging control unit 402, the rechargeable battery 403, the wireless communication unit 404, the RF tag 405, the display unit 406, the audio output unit 407, the operation unit 408, the memory 409, and the control unit 410. For example, each of the camera 103 and the video camera 104 may further include an image capturing unit for capturing an object to generate image data and a recording medium such as a memory card for storing the image data.

As long as the power receiving apparatus which can be operated by power supplied from the secondary battery, each of the camera 103, the video camera 104, the mobile phone 105, and the mobile phone 106 may be an electronic apparatus such as a recorder or a music player other than a digital still camera, a video camera, and a mobile phone, or may be a moving apparatus such as an automobile operated by power supplied from the secondary battery.

The charging system according to the first exemplary embodiment may be a system in which the power supply apparatus 101 transmits the power to the power receiving apparatus such as the camera 103 by electromagnetic induction, and the power receiving apparatus such as the camera 103 receives the power from the power supply apparatus 101 by electromagnetic induction.

Further, the charging system may be a system in which the power supply apparatus 101 transmits the power to the power receiving apparatus such as the camera 103 by resonant magnetic coupling, and the power receiving apparatus such as the camera 103 receives the power from the power supply apparatus 101 by resonant magnetic coupling. Furthermore, the charging system may be a system in which the power supply apparatus 101 transmits the power to the power receiving apparatus such as the camera 103 by resonant electric coupling, and the power receiving apparatus such as the camera 103 receives the power from the power supply apparatus 101 by resonant electric coupling.

Each of the power supply coil 201, the power receiving coil 401, the power receiving coil 501, the power receiving coil 601, and a power receiving coil 701 may be a helical antenna or a loop antenna, or may be a planar antenna such as a meander line antenna.

The present invention is also applicable to a system in which the power supply apparatus 101 supplies power to an electronic device 200 (not illustrated) in a non-contact manner by providing an electrode in place of a power supply antenna 108 for the power supply apparatus 101 and providing an electrode in place of a power receiving antenna for the electronic device 200.

The present invention is also applicable to a system in which the power supply apparatus 101 supplies power to the camera 103 in a non-contact manner by providing an electrode in place of the power supply coil 201 for the power supply apparatus 101 and providing an electrode in place of the power receiving coil 401 for the camera 103. In this case, a similar effect to that for the camera 103 can be also obtained for the video camera 104, the mobile phone 105, and the mobile phone 106 other than the camera 103.

The present invention is also applicable to a system in which the power supply apparatus 101 supplies power to the camera 103 in a non-contact manner by electric coupling. In this case, a similar effect to that for the camera 103 can be also obtained for the video camera 104, the mobile phone 105, and the mobile phone 106 other than the camera 103.

In the first exemplary embodiment, the power supply apparatus 101 transmits power to the camera 103, the video camera 104, the mobile phone 105, and the mobile phone 106 in a non-contact manner. Further, the camera 103, the video camera 104, the mobile phone 105, and the mobile phone 106 receive the power from the power supply apparatus 101 in a non-contact manner. However, "non-contact" may also be restated as "wireless" or "contactless".

In a system in which the power supply apparatus 101 transmits power to the power receiving apparatus such as the camera 103 by resonant magnetic coupling and the power receiving apparatus such as the camera 103 receives the power from the power supply apparatus 101 by resonant magnetic coupling, the power supply apparatus 101 and the power receiving apparatus such as the camera 103 further respectively have configurations other than the above-described configurations. In this case, the power supply apparatus 101 further includes a resonant circuit for controlling a frequency for oscillating an electromotive force generated in the power supply coil 201.

The resonant circuit in the power supply apparatus 101 includes elements such as a variable capacitor C, a variable coil L, and a variable resistor R (not illustrated). The control unit 211 can control a frequency of the power supply coil 201 and control power to be transmitted to the power receiving apparatus by controlling at least one of values of the variable capacitor C, the variable coil L, and the variable resistor R.

In this case, the camera 103 further includes a resonant circuit for controlling a frequency for changing power to be received from the power supply apparatus 101. The resonant circuit in the camera 103 includes elements such as a variable capacitor C, a variable coil L, and a variable resistor R (not illustrated). The control unit 410 can control a frequency of the power receiving coil 401 and control power that the camera 103 receives from the power supply apparatus 101 by controlling at least one of values of the variable capacitor C, the variable coil L, and the variable resistor R.

When the frequency of the power supply coil 201 matches the frequency of the power receiving coil 401, the power supply coil 201 and the power receiving coil 401 resonate magnetically. When the power supply coil 201 and the power receiving coil 401 resonate magnetically, the power supply apparatus 101 can transmit power to the camera 103 by resonant magnetic coupling, and the camera 103 can receive the power from the power supply apparatus 101 by resonant magnetic coupling.

In this case, the resonant circuit in the power supply apparatus 101 may be controlled so that the frequency of the power supply coil 201 in the power supply apparatus 101 matches the frequency of the power receiving coil 401 in the camera 103. The resonant circuit in the camera 103 may be controlled so that the frequency of the power receiving coil 401 in the camera 103 matches the frequency of the power supply coil 201 in the power supply apparatus 101.

When the power supply apparatus 101 causes a particular power receiving apparatus to be charged, the power supply apparatus 101 controls the resonant circuit in the power supply apparatus 101 so that the frequency of the power supply coil 201 matches the frequency of the power receiving coil 401 in the particular power receiving apparatus. In this case, the power supply apparatus 101 controls the resonant circuit in the power supply apparatus 101 so that the frequency of the power supply coil 201 does not match the frequency of a power receiving coil in the other power supply apparatus.

The power supply apparatus 101 may control the other power receiving apparatus so that the frequency of the power receiving coil in the other power receiving apparatus does not match the frequency of the power supply coil 201. This is because that the power receiving apparatus including the power receiving coil having a frequency, which does not match the frequency of the power supply coil 201, cannot receive the power transmitted from the power supply apparatus 101.

First recording process for recording, when any one of the power receiving apparatuses such as the camera 103, the video camera 104, the mobile phone 105, and the mobile phone 106 is placed on the charging area 102, history information relating to the power receiving apparatus that the power supply apparatus 101 detects in the charging area 102 will be described with reference to FIG. 5.

Figure 5:
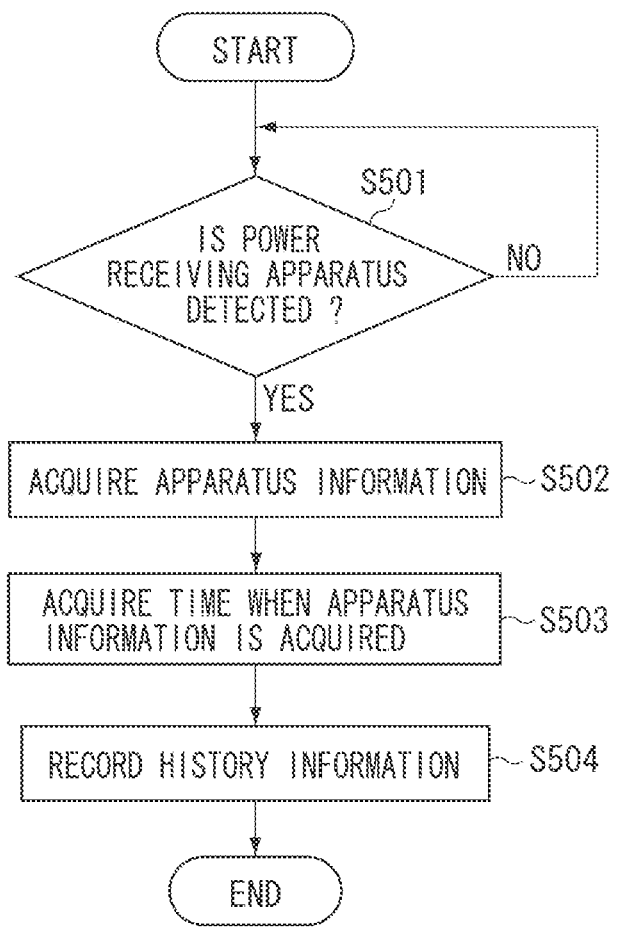
FIG. 5 is a flowchart illustrating an example of first recording process performed in the first exemplary embodiment of the present invention.

The first recording process illustrated in FIG. 5 is performed when a new power receiving apparatus is placed on the charging area 102. The first recording process illustrated in FIG. 5 will be described below by taking a case where the mobile phone 106 is newly placed on the charging area 102 with the camera 103, the video camera 104, and the mobile phone 105 placed on the charging area 102, as illustrated from FIG. 1A to FIG. 1B, as an example.

In step S501, the control unit 211 determines whether the RF tag reader 205 newly receives apparatus information from the RF tag 705 in the mobile phone 106 placed on the charging area 102.

If the RF tag reader 205 does not receive the apparatus information from the RF tag 705 in the mobile phone 106, the control unit 211 determines that the mobile phone 106 is not detected to have been placed on the charging area 102. If the mobile phone 106 is not detected to have been placed on the charging area 102 (NO in step S501), the control unit 211 returns the process to step S501 again. The apparatus information includes identification information and an IP address relating to the mobile phone 106.

If the RF tag reader 205 receives the apparatus information from the RF tag 705 in the mobile phone 106, the control unit 211 determines that the mobile phone 106 is detected to have been placed on the charging area 102. If the mobile phone 106 is detected to have been placed on the charging area 102 (YES in step S501), the control unit 211 advances the process from step S501 to step S502.

In step S502, the control unit 211 acquires the identification information and the IP address relating to the mobile phone 106, which are included in the apparatus information, from the RF tag 705 received by the RF tag reader 205. If the identification information and the IP address relating to the mobile phone 106 are acquired, the control unit 211 advances the process from step S502 to step S503.

In step S503, the control unit 211 acquires information representing the time when the apparatus information is received from the mobile phone 106 from the time management unit 206 acquires. If the control unit 211 acquired the information representing the time when the apparatus information is received from the mobile phone 106, the control unit 211 advances the process from step S503 to step S504.

In step S504, the control unit 211 stores the identification information and the IP address relating to the acquired mobile phone 106, and the information representing the time when the apparatus information is received from the mobile phone 106 as history information in the memory 210. If the identification information and the IP address relating to the mobile phone 106, and the information representing the time when the apparatus information is received from the mobile phone 106 are recorded in the memory 210, the process ends.

The item "No." in the history table illustrated in FIGS. 3A to 3C is the identification information acquired in step S502, and the item "connection time" is the information representing the time when the apparatus information is received from the mobile phone 106 in step S503 is acquired.

While in the first exemplary embodiment, the RF tag is used to detect that the power receiving apparatus has been placed on the charging area 102 and acquire the apparatus information from the power receiving apparatus, the present invention is not limited to this.

When the power receiving apparatus is placed on the charging area 102, and the power receiving coil in the power receiving apparatus starts to receive the power, the power supply coil 201 in the power supply apparatus 101 can detect a change of power consumption. According to this method, it can be detected whether the power receiving apparatus has been placed on the charging area 102.

The apparatus information of the power receiving apparatus can also be acquired using the wireless communication unit. In this case, the IP address can be set using a plug and play technique such as Digital Living Network Alliance (DLNA) or Universal Plug & Play (UPnP).

First selection process for the power supply apparatus 101 to select the power receiving apparatus to be charged from among the power receiving apparatuses such as the camera 103, the video camera 104, and the mobile phone 105 placed on the charging area 102 will be described with reference to FIG. 6. The first selection process illustrated in FIG. 6 will be described below by taking a case where the mobile phone 106 is newly placed on the charging area 102, as illustrated from FIG. 1A to FIG. 1B, as an example.

The camera 103, the video camera 104, and the mobile phone 105 respectively correspond to "DSC_00001", "DVC_00001", and "MobilePhone_00001" illustrated in FIGS. 3A to 3C. The mobile phone 106 corresponds to "MobilePhone_00002".

In step S601, the control unit 211 determines whether the mobile phone 106 is detected to have been placed on the charging area 102. The process performed in step S601 is similar to the process described in step S501. If the mobile phone 106 is not detected to have been placed on the charging area 102 (NO in step S601), the control unit 211 returns the process to step S601 again. If the mobile phone 106 is detected to have been placed on the charging area 102 (YES in step S601), the control unit 211 advances the process from step S601 to step S602.

In step S602, the control unit 211 performs first recording process illustrated in FIG. 5. By the process performed in step S602, the history information table stored in the memory 210 will be as illustrated in FIGS. 7A to 7C. FIGS. 3A to 3C illustrate the history information tables before the process in step S602 is performed and FIGS. 7A to 7C illustrate the history information tables after the process in step S602 is performed.

In FIGS. 7A and 7B, a connection time of "MobilePhone_00002" representing the mobile phone 106 is added to in the lowermost line 101 of the item "No." illustrated in FIGS. 3A and 3B. In FIG. 7C, "number of times of connection/per month" corresponding to "MobilePhone_00002" is made larger by one than "number of times of connection/per month" illustrated in FIG. 3C.

In step S603, the control unit 211 causes the wireless communication unit 204 to acquire charged state information from the mobile phone 106. The control unit 211 causes the wireless communication unit 204 to transmit a request instruction for requesting the charged state information relating to the mobile phone 106 to the IP address acquired by the RF tag reader 205. The control unit 710 in the mobile phone 106 which has received the request instruction by the wireless communication unit 704 causes the charging control unit 702 to acquire charged state information relating to the rechargeable battery 703, and causes the wireless communication unit 704 to transmit a response corresponding to the request instruction together with the charged state information relating to the rechargeable battery 703 to the power supply apparatus 101. Thus, the control unit 211 of the power supply apparatus 101 acquires the charged state information relating to the mobile phone 106.

In step S604, the control unit 211 (a determination unit) determines whether the remaining capacity of the rechargeable battery 703 is a predetermined value or less based on the charged state information relating to the mobile phone 106 acquired in step S603. If the remaining capacity of the rechargeable battery 703 is the predetermined value or less (YES in step S604), the control unit 211 advances the process from step S604 to step S605. If the remaining capacity of the rechargeable battery 703 is more than the predetermined value (NO in step S604), the control unit 211 advances the process from step S604 to step S606.

In step S605, the control unit 211 selects the mobile phone 106 as a power receiving apparatus to be charged. If the mobile phone 106 is selected as the power receiving apparatus to be charged, the control unit 211 advances the process from step S605 to step S607.

In step S607, the control unit 211 causes the wireless communication unit 204 to transmit a charging start request to the mobile phone 106 which is selected as the power receiving apparatus to be charged in step S605. The control unit 211 further controls the wireless communication unit 204 to transmit a charging stop request to all the power receiving apparatuses other than the mobile phone 106. In this case, the mobile phone 106 which has received the charging start request controls the charging control unit 702 included therein to start to receive power to start to charge the rechargeable battery 703.

When the power supply apparatus 101 supplies power to the camera 103 other than the mobile phone 106, the control unit 211 controls the wireless communication unit 204 to transmit the charging stop request to the camera 103 before transmitting the charging start request to the mobile phone 106. In this case, the camera 103 which has received the charging stop request controls the charging control unit 402 included therein not to charge the rechargeable battery 403 by the power supplied from the power supply apparatus 101. If the charging start request is transmitted, the control unit 211 ends the first selection process.

The power supply apparatus 101 controls the wireless communication unit 204 not to transmit the charging stop request to the mobile phone 106 until the mobile phone 106 finishes charging the rechargeable battery 703, and causes the mobile phone 106 to continue to charge the rechargeable battery 703. Further, the power supply apparatus 101 controls the wireless communication unit 204 not to transmit the charging stop request to the mobile phone 106 until the power receiving apparatus other than the mobile phone 106 is selected as the power receiving apparatus to be charged, and causes the mobile phone 106 to continue to charge the rechargeable battery 703. When the rechargeable battery 703 is fully charged, the charging of the rechargeable battery 703 is completed.

The charging start request means a request to cause a power receiving apparatus which is not charging a rechargeable battery to start to charge the rechargeable battery. The charging stop request also means a request to cause a power receiving apparatus which is charging a rechargeable battery not to stop charging the rechargeable battery.

The charging stop request means a request to cause a power receiving apparatus which is not charging a rechargeable battery not to charge the rechargeable battery by the power supplied from the power supply apparatus 101. The charging stop request also means a request to cause a power receiving apparatus which is charging a rechargeable battery to stop charging the rechargeable battery.

When the power supply apparatus 101 supplies the power to the video camera 104 and the mobile phone 105, the control unit 211 causes the wireless communication unit 204 to transmit the charging stop request to the video camera 104 and the mobile phone 105 before transmitting the charging start request to the mobile phone 106. In this case, the video camera 104 and the mobile phone 105 which have received the charging stop request do not charge the rechargeable battery by the power supplied from the power supply apparatus 101. When the power supply apparatus 101 has already supplied the power to the mobile phone 106, the charging of the rechargeable battery 703 by the mobile phone 106 is continued without being stopped.

In step S606, the control unit 211 determines an apparatus that is most frequently detected to have been placed on the charging area 102 as a priority object of charging based on information recorded in the history information table. The control unit 211 reads out history information relating to the mobile phone 106 and history information relating to each of the camera 103, the video camera 104, and the mobile phone 105 from the memory 210.

The control unit 211 further compares "number of times of connection/month" included in the history information relating to the mobile phone 106 with "number of times of connection/month" included in each of the camera 103, the video camera 104, and the mobile phone 105. As a result of the comparison, the control unit 211 selects the mobile phone 105 corresponding to "MobilePhone_00001", which is largest in "number of times of connection/month" illustrated in FIG. 7C, as the power receiving apparatus to be charged.

If the mobile phone 105 is selected as the power receiving apparatus to be charged in step S606, then in step S607, the control unit 211 causes the wireless communication unit 204 to transmit the charging start request to the mobile phone 105 which has been selected in step S606. The control unit 211 further controls the wireless communication unit 204 to transmit the charging stop request to the power receiving apparatus other than the mobile phone 105.

The mobile phone 105 which has received the charging start request controls the charging control unit 602 included therein to start to charge the rechargeable battery 603. In this case, when the power supply apparatus 101 supplies the power to all the power receiving apparatuses other than the mobile phone 105, the control unit 211 controls the wireless communication unit 204 to transmit the charging stop request to all the power receiving apparatuses other than the mobile phone 105 before transmitting the charging start request to the mobile phone 105. If the charging start request is transmitted, the control unit 211 ends the first selection process.

The power supply apparatus 101 controls the wireless communication unit 204 not to transmit the charging stop request to the mobile phone 105 until the mobile phone 105 finishes charging the rechargeable battery 603, and causes the mobile phone 105 to continue to charge the rechargeable battery 603. The power supply apparatus 101 controls the wireless communication unit 204 not to transmit the charging stop request to the mobile phone 105 until the power receiving apparatus other than the mobile phone 105 is selected as the power receiving apparatus to be charged, and causes the mobile phone 105 to continue to charge the rechargeable battery 603. When the rechargeable battery 603 is fully charged, the charging of the rechargeable battery 603 is completed.

A remaining time for each of the power receiving apparatuses placed on the charging area 102 to be fully charged may be displayed on the display unit 207 and notified to the user after the process in step S607 is performed. At the same time, the remaining time may also be notified to the user by outputting audio data from the audio output unit 208 in the power supply apparatus 101 or emitting light by a light emitting device (not illustrated), for example.

The power supply apparatus 101 according to the first exemplary embodiment can select the power receiving apparatus which is charged as a priority object of charging from among the plurality of power receiving apparatuses placed on the charging area 102 based on the history information pieces relating to the power receiving apparatuses. Thus, the power supply apparatus 101 can charge the power receiving apparatus desired by the user when the power supply apparatus 101 supplies the power to the plurality of power receiving apparatuses in a non-contact manner.

Further, the power supply apparatus 101 can charge the power receiving apparatus the remaining capacity of which is a predetermined value or less from among the plurality of power receiving apparatuses placed on the charging area 102. When the power supply apparatus 101 supplies the power to the plurality of power receiving apparatuses in a non-contact manner, whichever of the power receiving apparatuses the user uses, the power receiving apparatus the remaining battery capacity thereof is larger than the predetermined value can be operated.

When the predetermined value to be compared with the remaining capacity of the power receiving apparatus is set to a threshold value representing power capable of operating the wireless communication unit in the power receiving apparatus, the power receiving apparatus can be charged to perform wireless communication with the external apparatus.

When the predetermined value to be compared with the remaining battery capacity of the power receiving apparatus is set to the threshold value representing power for causing the power receiving apparatus to perform a predetermined operation, the power supply apparatus 101 can charge the power receiving apparatus to perform a minimum of the predetermined operation.

The first recording process and the first selection process have been described by taking a case where the mobile phone 106 is newly placed on the charging area 102 with the camera 103, the video camera 104, and the mobile phone 105 placed on the charging area 102, as illustrated from FIG. 1A to FIG. 1B, as an example. When the camera 103, the video camera 104, or the mobile phone 105 other than the mobile phone 106 is placed on the charging area 102, however, the first recording process and the first selection process are also performed, like when the mobile phone 106 is placed on the charging area 102.

If the power supply apparatus 101 causes the mobile phone 106 selected in step S605 to be charged by resonant magnetic coupling, then in step S607, the control unit 211 controls the resonant circuit in the power supply apparatus 101 so that a frequency of the power supply coil 201 matches a frequency of the power receiving coil 701 in the mobile phone 106. In this case, the control unit 211 causes the wireless communication unit 204 to transmit a request to acquire information representing the frequency of the power receiving coil 701 in the mobile phone 106 to the mobile phone 106.

When the information representing the frequency of the power receiving coil 701 in the mobile phone 106 is acquired, the control unit 211 controls at least one of the variable capacitor C and the variable coil L, which are included in the resonant circuit, so that the frequency of the power supply coil 201 matches the frequency of the power receiving coil 701 in the mobile phone 106.

The control unit 211 further transmits a request, to all the power receiving apparatuses other than the mobile phone 106, to perform control so that the frequencies of the power receiving coils in all the power receiving apparatuses other than the mobile phone 106 do not match the frequency of the power receiving coil 701.

If the power supply apparatus 101 causes the mobile phone 106 selected in step S606 to be charged by resonant magnetic coupling, then in step S607, the control unit 211 controls the resonant circuit in the power supply apparatus 101 so that the frequency of the power supply coil 201 matches the frequency of the power receiving coil 701 in the mobile phone 106. In this case, the control unit 211 causes the wireless communication unit 204 to transmit the request to acquire information representing the frequency of the power receiving coil 701 in the mobile phone 106 to the mobile phone 106.

When the information representing the frequency of the power receiving coil 701 in the mobile phone 106 is acquired, the control unit 211 controls at least one of the variable capacitor C and the variable coil L, which are included in the resonant circuit, so that the frequency of the power supply coil 201 matches the frequency of the power receiving coil 701 in the mobile phone 106.

The control unit 211 further transmits a request, to all the power receiving apparatuses other than the mobile phone 106, to perform control so that the frequencies of the power receiving coils in all the power receiving apparatuses other than the mobile phone 106 do not match the frequency of the power receiving coil 701.

In the first exemplary embodiment, an example in which the power receiving apparatus having a high frequency of charging is charged by referring to the history information table is described. On the other hand, in a second exemplary embodiment, an example in which a power receiving apparatus to be charged is selected based on estimated removal time which is estimated as the time when a user remove a power receiving apparatus from a charging area 102 will be described with reference to FIGS. 8 to 10. In the second exemplary embodiment, configurations and operations of a power supply apparatus 101, a camera 103, a video camera 104, a mobile phone 105, and a mobile phone 106 are similar to those in the first exemplary embodiment, and hence the description thereof is not repeated.

Figure 8:
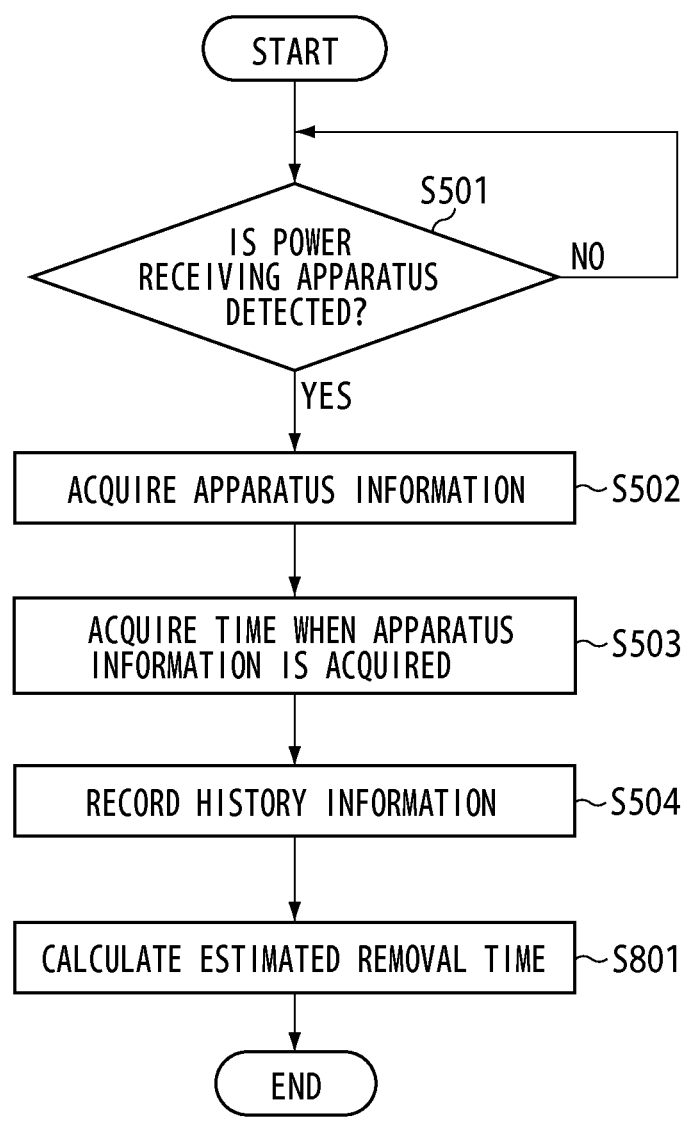
FIG. 8 is a flowchart illustrating an example of second recording process performed in the second exemplary embodiment of the present invention.

Referring to FIG. 8, second recording process for the power supply apparatus 101 to record, when any one of the power receiving apparatuses such as the camera 103, the video camera 104, the mobile phone 105, and the mobile phone 106 is detected in the charging area 102, history information relating to the power receiving apparatus detected in the charging area 102 is described. The second recording process illustrated in FIG. 8 is performed when a new power receiving apparatus is placed on the charging area 102.

The second recording process illustrated in FIG. 8 will be described below by taking a case where the mobile phone 106 is newly placed on the charging area 102, as illustrated from FIG. 1A to FIG. 1B. Similar processes in a flowchart illustrated in FIG. 8 to those illustrated in FIG. 5 described in the first exemplary embodiment are assigned the same step numbers, and hence the description thereof is not repeated. More specifically, processes performed in steps S501 to S504 illustrated in FIG. 8 are similar to the processes in steps S501 to S504 illustrated in FIG. 5.

In step S504, if the identification information and the IP address relating to the acquired mobile phone 106, and the information representing the time when the apparatus information is acquired from the mobile phone 106 are stored as the history information in the memory 210, the control unit 211 advances the process from step S504 to step S801.

In step S801, the control unit 211 calculates an estimated removal time of the mobile phone 106 from a value representing a removal time recorded in the history information table. The control unit 211 calculates from "removal time" of each power receiving apparatus recorded in the history information table an estimated removal time serving as an average of the removal times.

FIG. 9 illustrates an example of the history information table. The history information table in FIG. 9 includes an item "estimated removal time" in addition to the items illustrated in FIG. 7C. "Estimated removal time" is obtained by calculating an average of information pieces relating to an hour and a minute in "removal time" illustrated in FIG. 7B for each of the power receiving apparatuses ("ID"). In FIG. 9, the mobile phone 105 corresponding to "MobilePhone_00001" is estimated to be taken out by the user at "7:20" on average.

While an average of the removal times by the day is calculated, to calculate the estimated removal time in step S801, a period serving as a unit is not limited to the day. For example, an average of the removal times may be calculated by the week, to calculate the estimated removal time, for example, what day of the week and what time of the day the mobile phone is removed on average. The calculation of the average removal time may target only the power receiving apparatus "number of times of connection/month" of which exceeds a predetermined number to improve estimation accuracy.

The control unit 211 stores the estimated removal time of the mobile phone 106 in the memory 210 when the estimated removal time of the mobile phone 106 is calculated. When the estimated removal time is stored in the memory 210, the control unit 211 ends the second recording process. The estimated removal time corresponding to each of the power receiving apparatuses is stored in the memory 210. When the camera 103, the video camera 104, and the mobile phone 105 are placed on the charging area 102, for example, the estimated removal time of the camera 103, the estimated removal time of the video camera 104, and the estimated removal time of the mobile phone 105 are recorded in the memory 210.

Second selection process for selecting the power receiving apparatus to be charged when the mobile phone 106 is newly placed on the charging area 102 with the camera 103, the video camera 104, and the mobile phone 105 placed on the charging area 102 will be described with reference to FIG. 10. The second selection process illustrated in FIG. 10 will be described below by taking a case where the mobile phone 106 is newly placed on the charging area 102, as illustrated from FIG. 1A to FIG. 1B, as an example.

Figure 6:
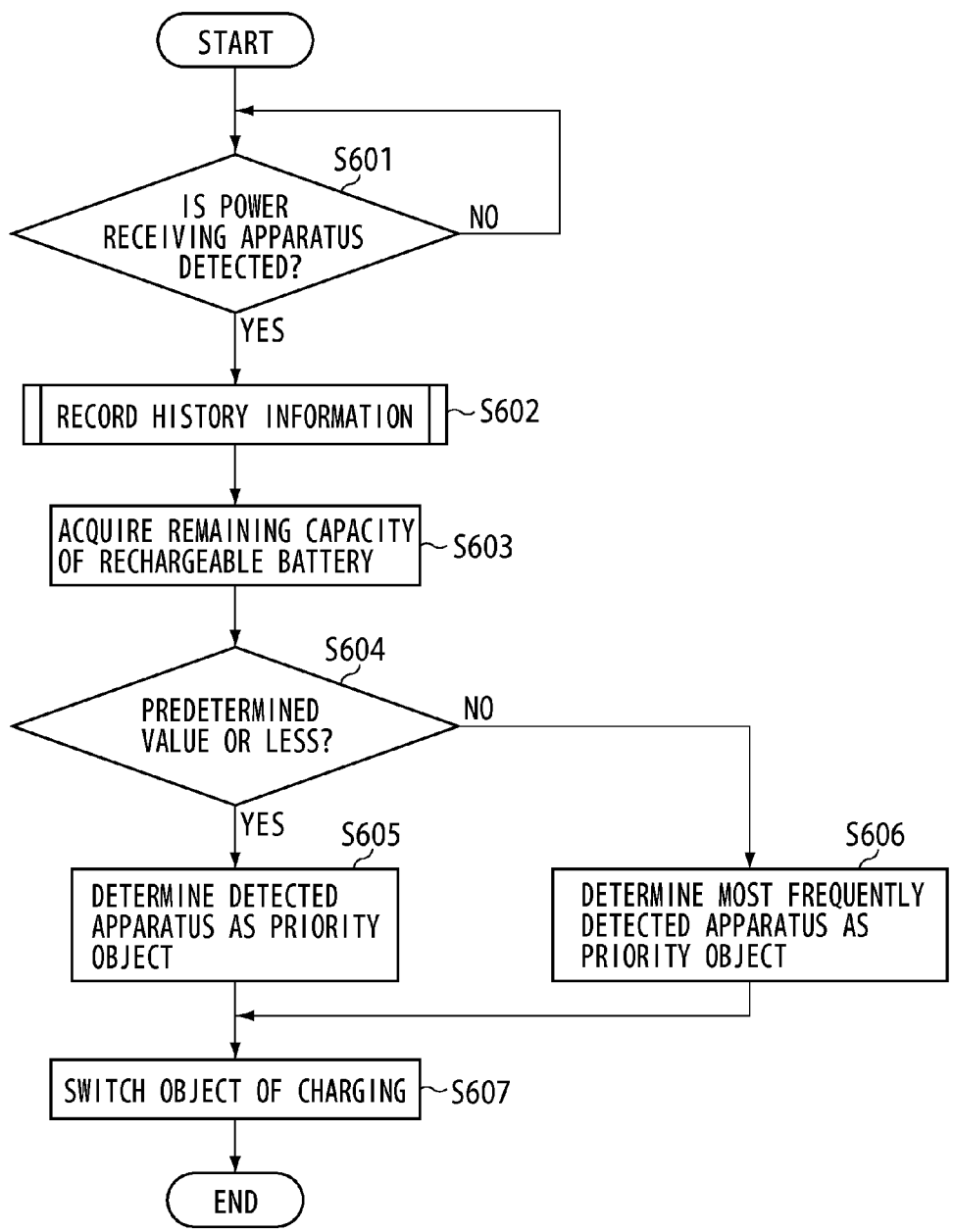
FIG. 6 is a flowchart illustrating an example of first selection process performed in the first exemplary embodiment of the present invention.

Similar processes in a flowchart illustrated in FIG. 10 to the processes illustrated in FIG. 6 described in the first exemplary embodiment are assigned the same step numbers, and hence the description thereof is not repeated. More specifically, processes performed in steps S601, S603 to S605, and S607 illustrated in FIG. 10 are similar to the processes in steps S601, S603 to S605, and S607 illustrated in FIG. 6.

While the control unit 211 performs the first recording process illustrated in FIG. 5 in step S602 in the first selection process in the first exemplary embodiment, the control unit 211 performs the second recording process illustrated in FIG. 8 in step S602 in the second selection process in the second exemplary embodiment.

If the remaining capacity of the rechargeable battery 703 is larger than a predetermined value (NO in step S604), the control unit 211 advances the process from step S604 to step S1001.

In step S1001, the control unit 211 causes the time management unit 206 to acquire current time information representing the current time. If the time management unit 206 acquires the current time information, the control unit 211 advances the process from step S1001 to S1002.

In step S1002, the control unit 211 reads out each of the estimated removal times of the camera 103, the video camera 104, the mobile phone 105, and the mobile phone 106, which are placed on the charging area 102, from the memory 210. Further, the control unit 211 compares the estimated removal times of the camera 103, the video camera 104, the mobile phone 105, and the mobile phone 106 with the current time information acquired in step S1001.

The control unit 211 selects the power receiving apparatus having an estimated removal time closest to the current time as the power receiving apparatus to be charged from among the camera 103, the video camera 104, the mobile phone 105, and the mobile phone 106 as a result of the comparison. If the power receiving apparatus to be charged is selected, the control unit 211 advances the process from step S1002 to step S607.

If the mobile phone 105 is selected as the power receiving apparatus to be charged in step S1002, then in step S607, the control unit 211 causes the wireless communication unit 204 to transmit the charging start request to the power receiving apparatus having the closest estimated removal time selected in step S1002. The control unit 211 controls the wireless communication unit 204 to transmit the charging stop request to all the power receiving apparatuses other than the power receiving apparatus selected in step S1002. If the charging start request is transmitted, the control unit 211 ends the second selection process.

As described above, the power supply apparatus 101 according to the second exemplary embodiment can thus select the power receiving apparatus having the estimated removal time closest to the current time as a priority object for charging from among the plurality of power receiving apparatuses placed on the charging area 102 based on the history information relating to the power receiving apparatus. When the power supply apparatus 101 causes the plurality of power receiving apparatuses to be charged in a non-contact manner, therefore, the power receiving apparatus desired by the user can be charged.

The second recording process and the second selection process have been described by taking a case where the mobile phone 106 is newly placed on the charging area 102 with the camera 103, the video camera 104, and the mobile phone 105 placed on the charging area 102, as illustrated from FIG. 1A to FIG. 1B, as an example. When the camera 103, the video camera 104, or the mobile phone 105 other than the mobile phone 106 is placed on the charging area 102, however, the second recording process and the second selection process are also performed, like when the mobile phone 106 is placed on the charging area 102.

For items common to those in the first exemplary embodiment, a similar effect to that in the first exemplary embodiment can be obtained in the second exemplary embodiment.

While the first and second exemplary embodiments have been described, assuming an electromagnetic induction system as a non-contact charging system, the present invention is not limited to this system.

In the first and second exemplary embodiments, the first selection process and the second selection process are performed when the power receiving apparatus is newly placed on the charging area. However, the first selection process and the second selection process may be performed even when the power receiving apparatus which is being charged is removed of the charging area or when the power receiving apparatus that is being charged is fully charged. Further, the first selection process and the second selection process may be performed when the power receiving apparatus that is being charged is removed of the charging area, and is then placed on the charging area again.

In the first and second exemplary embodiments, in step S607, if the power receiving apparatus to be charged is selected, an object to be charged is not changed until the charging of the selected power receiving apparatus is completed. However, not only one power receiving apparatus but a plurality of power receiving apparatuses placed on the charging area may be selected as the power receiving apparatus to be charged, to determine the order in which the power receiving apparatuses are charged based on the history information table.

In this case, in step S607, the plurality of power receiving apparatuses is charged while being switched in a time-divisional manner based on the determined order. Therefore, a charging time to be allocated for charging per unit time is set longer to the higher-priority power receiving apparatus and is set shorter to the lower-priority power receiving apparatus.

In the first exemplary embodiment, a case where priorities to be assigned to the mobile phone 105, the mobile phone 106, the camera 103, and the video camera 104 are selected in this order is taken as an example with reference to the history information table illustrated in FIG. 7C. For example, charging time to be allocated for charging of the mobile phone 105, the mobile phone 106, the camera 103, and the video camera 104 may be respectively "60 minutes", "30 minutes", "20 minutes", and "10 minutes".

The mobile phone 105 charges the rechargeable battery 603 until the allocated charging time "60 minutes" elapses. During this period, the camera 103, the video camera 104, and the mobile phone 106 do not charge the rechargeable batteries by the power from the power supply apparatus 101. The mobile phone 105 stops charging the rechargeable battery 503 in response to a charging stop instruction transmitted from the power supply apparatus 101 after the allocated charging time "60 minutes" elapses.

In this case, the mobile phone 106 starts to charge the rechargeable battery 603 in response to a charging start instruction transmitted from the power supply apparatus 101, and continues to charge the rechargeable battery 603 until the allocated charging time "30 minutes" elapses. At this time, the camera 103, the video camera 104, and the mobile phone 105 do not charge the respective rechargeable batteries.

In the second exemplary embodiment, a case where priorities is selected in the order in which the estimated removal time is closer to the current time with reference to the history information table illustrated in FIG. 9 is taken as an example. When the current time is "12:00", for example, the respective estimated removal times of the camera 103, the video camera 104, the mobile phone 106, and the mobile phone 105 close to the current time in this order.

In this case, periods of time to be allocated for charging of the camera 103, the video camera 104, the mobile phone 106, and the mobile phone 105 may be respectively "60 minutes", "30 minutes", "20 minutes", and "10 minutes".

A charging time to be allocated for charging may be changeable by the user or may be previously set as long as the longer charging time is allocated to the higher-priority power receiving apparatus and the shorter charging time is allocated to the lower-priority power receiving apparatus.

In the first exemplary embodiment, in step S606, the control unit 211 determines an apparatus that is most frequently detected to have been placed on the charging area 102 as a priority object of charging based on the information recorded in the history information table. If two or more apparatuses that are most frequently detected to have been placed on the charging area 102 are detected in step S606, the control unit 211 may advance the process from step S606 to steps S1001 and S1002 in the second exemplary embodiment. In steps S1001 and S1002, the control unit 211 may select the power receiving apparatus having the estimated removal time closest to the current time as the power receiving apparatus to be charged.

If two or more apparatuses that are most frequently detected to have been placed on the charging area 102 are detected in step S606, the control unit 211 may select the power receiving apparatus having a connection time closest to the current time as the power receiving apparatus to be charged.

The configurations and the functions described in the first and second exemplary embodiments according to the present invention are also implemented by a computer program executable by a computer. In this case, the computer program is read out by the computer from a computer-readable recording medium, and is implemented by the computer. In this case, a hard disk device, an optical disk, a compact disk read-only memory (CD-ROM), a compact disc recordable (CD-R), a memory card, a read-only memory (ROM), or the like can be used as the computer-readable recording medium. The computer program may be provided to the computer from an external apparatus via a communication interface and implemented by the computer.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-070563 filed Mar. 25, 2010, which is hereby incorporated by reference herein in its entirety.

What is claimed is:

1. A power supply apparatus comprising:
a power supply unit configured to supply power to at least one of a first power receiving apparatus and a second power receiving apparatus if the first and the second power receiving apparatuses are in a predetermined range;
an acquisition unit configured to acquire first and second information; and
a control unit configured to select, based on the first and the second information, one of the first and the second power receiving apparatuses if the first and the second power receiving apparatuses are in the predetermined range,
wherein the control unit causes a selected apparatus to perform a predetermined process,
wherein the predetermined process includes a process for charging a battery,
wherein the first information includes information indicating that a first number of times it has been detected the first power receiving apparatus is in the predetermined range, and
wherein the second information includes information indicating that a second number of times it has been detected the second power receiving apparatus is in the predetermined range.

2. The power supply apparatus according to claim 1, further comprising: a comparison unit configured to compare the first and the second number of times,
wherein, if the first number of times is larger the second number of times, the control unit selects the first power receiving apparatus.

3. The power supply apparatus according to claim 1,
wherein the first information includes information indicating a first time that it is detected the first power receiving apparatus is removed from the predetermined range, and
wherein the second information includes information indicating a second time that it is detected the second power receiving apparatus is removed from the predetermined range.

4. The power supply apparatus according to claim 1, further comprising:
a determination unit configured to determine, if the first power receiving apparatus is in the predetermined range, whether a remaining capacity of a first battery is a predetermined value or less,
wherein, if the second power receiving apparatus is in the predetermined range, the determination unit determines whether a remaining capacity of a second battery is the predetermined value or less,
wherein, if the remaining capacity of the first battery and the remaining of the second battery are not the predetermined value or less, the control unit selects one of the first and the second power receiving apparatuses based on the first and the second information,
wherein the first battery is a battery detachably attached to the first power receiving apparatus, and
wherein the second battery is a battery detachably attached to the second power receiving apparatus.

5. The power supply apparatus according to claim 4, wherein, if the remaining capacity of the first battery is not the predetermined value or less and the remaining capacity of the second battery is the predetermined value or less, the control unit selects the second power receiving apparatus.

6. The power supply apparatus according to claim 1, wherein the predetermined range is a range indicating that the first and the second power receiving apparatuses can receive power supplied from the power supply apparatus.

7. A method comprising:
supplying power to at least one of a first power receiving apparatus and a second power receiving apparatus if the first and the second power receiving apparatuses are in a predetermined range;
acquiring first information and second information;
selecting, based on the first and the second information, one of the first and the second power receiving apparatuses if the first and the second power receiving apparatuses are in the predetermined range; and
causing a selected apparatus to perform a predetermined process,
wherein the predetermined process includes a process for charging a battery,
wherein the first information includes information indicating that a first number of times it has been detected the first power receiving apparatus is in the predetermined range, and
wherein the second information includes information indicating that a second number of times it has been detected the second power receiving apparatus is in the predetermined range.

8. The method according to claim 7, further comprising:
comparing the first and the second number of times; and
selecting the first power receiving apparatus if the first number of times is larger the second number of times.

9. The method according to claim 7,
wherein the first information includes information indicating a first time that it is detected the first power receiving apparatus is removed from the predetermined range, and
wherein the second information includes information indicating a second time that it is detected the second power receiving apparatus is removed from the predetermined range.

10. The method according to claim 7, further comprising:
determining, if the first power receiving apparatus is in the predetermined range, whether a remaining capacity of a first battery is a predetermined value or less;

determining whether a remaining capacity of a second battery is the predetermined value or less if the second power receiving apparatus is in the predetermined range; and selecting one of the first and the second power receiving apparatuses based on the first and the second information if the remaining capacity of the first battery and the remaining of the second battery are not the predetermined value or less, wherein the first battery is a battery detachably attached to the first power receiving apparatus, and wherein the second battery is a battery detachably attached to the second power receiving apparatus.

11. The method according to claim 10, further comprising:
selecting the second power receiving apparatus if the remaining capacity of the first battery is not the predetermined value or less and the remaining capacity of the second battery is the predetermined value or less.

12. The method according to claim 7, wherein the predetermined range is a range indicating that the first and the second power receiving apparatuses can receive the supplied power from the apparatus.

13. A computer-readable recording medium storing a program, wherein the program causes a computer to perform a method, the method comprising:

supplying power to at least one of a first power receiving apparatus and a second power receiving apparatus if the first and the second power receiving apparatuses are in a predetermined range;

acquiring first and second information;

selecting, based on the first and the second information, one of the first and the second power receiving apparatuses if the first and the second power receiving apparatuses are in the predetermined range; and causing a selected apparatus to perform a predetermined process, wherein the predetermined process includes a process for charging a battery, wherein the first information includes information indicating that a first number of times it has been detected the first power receiving apparatus is in the predetermined range, and wherein the second information includes information indicating that a second number of times it has been detected the second power receiving apparatus is in the predetermined range.

14. The computer-readable recording medium according to claim 13, further comprising:
comparing the first and the second number of times; and
selecting the first power receiving apparatus if the first number of times is larger the second number of times.

15. The computer-readable recording medium according to claim 13,
wherein the first information includes information indicating a first time that it is detected the first power receiving apparatus is removed from the predetermined range, and
wherein the second information includes information indicating a second time that it is detected the second power receiving apparatus is removed from the predetermined range.

16. The computer-readable recording medium according to claim 13, further comprising:
determining, if the first power receiving apparatus is in the predetermined range, whether a remaining capacity of a first battery is a predetermined value or less;
determining whether a remaining capacity of a second battery is the predetermined value or less if the second power receiving apparatus is in the predetermined range; and
selecting one of the first and the second power receiving apparatuses based on the first and the second information if the remaining capacity of the first battery and the remaining of the second battery are not the predetermined value or less,
wherein the first battery is a battery detachably attached to the first power receiving apparatus, and
wherein the second battery is a battery detachably attached to the second power receiving apparatus.

17. The computer-readable recording medium according to claim 16, further comprising:
selecting the second power receiving apparatus if the remaining capacity of the first battery is not the predetermined value or less and the remaining capacity of the second battery is the predetermined value or less.

18. The computer-readable recording medium according to claim 13, wherein the predetermined range is a range indicating that the first and the second power receiving apparatuses can receive the supplied power.

* * * * *